United States Patent [19]

DeShazo

[11] Patent Number: 5,610,792
[45] Date of Patent: Mar. 11, 1997

[54] APPARATUS FOR CONTROLLING THE RESET OF A BUS CONNECTED TRANSCEIVER

[76] Inventor: Thomas R. DeShazo, 215 Kingwood Rd., Frenchtown, N.J. 08825

[21] Appl. No.: 562,609

[22] Filed: Nov. 24, 1995

Related U.S. Application Data

[63] Continuation of Ser. No. 203,954, Mar. 1, 1994, abandoned.

[51] Int. Cl.$^6$ ..................................................... H02H 5/04
[52] U.S. Cl. .......................... 361/103; 361/98; 361/101
[58] Field of Search .................................. 361/103, 106, 361/93, 98, 100–101; 327/512–513, 378

[56] References Cited

U.S. PATENT DOCUMENTS

| | | | |
|---|---|---|---|
| 4,092,693 | 5/1978 | Ishikawa et al. | 361/103 |
| 4,345,218 | 8/1982 | Congdon et al. | 330/298 |
| 5,099,381 | 3/1992 | Wilcox | 361/103 |
| 5,267,118 | 11/1993 | Marshall et al. | 361/103 |
| 5,359,236 | 10/1994 | Giordano et al. | 327/512 |

Primary Examiner—Jeffrey A. Gaffin
Assistant Examiner—Michael J. Sherry
Attorney, Agent, or Firm—Joel I. Rosenblatt

[57] ABSTRACT

A method and apparatus for stopping the operation of a failed device and preventing that device from being turned back on is shown, using two thresholds, a first failure threshold is shown when the device may be turned off or prevented from further operation. A second safe operation threshold is shown, different from the first threshold and within the safe operation range of the device. As the temperature rises, this transistor is driven further to conduction diverting base current from a second transistor and driving it further into nonconduction. The collector current from the second transistor is diverted to a resistor providing additional bias to the temperature sensitive transistor and driving it to a new bias. This bias establishes the second threshold. According to the inventive principles, the device is prevented from being turned back on until the safe operating threshold is reached. Further, a second condition requiring the reset signal for the device to be cycled through one complete cycle from off to on is shown. In the preferred embodiment, a temperature sensitive transistor is shown having a negative temperature coefficient.

16 Claims, 3 Drawing Sheets

APPARATUS FOR CONTROLLING THE RESET OF A BUS CONNECTED TRANSCEIVER

This is a continuation of application Ser. No. 08/203,954, filed Mar. 1, 1994, Abandoned.

FIELD OF THE INVENTION

This invention is in the field of controls for preventing a reconnection of a failed component such as a transceiver to a bus and in particular for controlling the reconnection of a failed transceiver to a bus until its control off-on signal has been reset through at least one cycle and the transceiver has signaled it is in its safe state and ready to operate.

BACKGROUND OF THE INVENTION

In automotive applications, a transceiver producing a pulse width coded output signal may be connected to a bus. These transceivers may produce a pulse width coded output to indicate or control local operating conditions for example conditions within an automobile engine. In case of failure of the transceiver, for example by a shorted input, excessive heating may develop, jeopardizing the transceiver and preventing proper operation of the bus. The failed transceiver may load the bus with an erroneous signal, preventing other transceivers from using the bus.

Accordingly, when a transceiver fails such as by a short, it is important to produce an indication of that short and remove the transceiver output signal from the bus. Where the output signal is a current directed into a low impedance connected to a positive voltage or to ground, a failure providing a constant current signal into the bus will cause the bus voltage level to be constant and prevent its proper operation by preventing other transceivers connected to the bus from transferring information.

When the failure is abated and the failed condition is changed to a normal condition, the failed device can automatically be reset and returned to operation. If the defect causing the failure is at or close to its failure condition, a reset signal, placing the transceiver into operation may cause another failure. Accordingly, the failed transceiver should not be placed back in operation until it is in a safe operating range separated from the failure threshold. Where the control signal cycles on and the transceiver failure indicator is near its threshold failure condition, the occurrence of an on reset signal turning the transceiver on again when at that threshold failure condition, may cause a premature failure. Accordingly, it is important to prevent the transceiver or element from being turned on even in the presence of a reset signal until its operating condition is within its safe operating range, within the threshold failure level with a margin of safety, indicating safe operation. To prevent the failed transceiver from operating before a reset signal is given, a reset control on signal should be cycled through one complete cycle from off to on, before the failed unit is allowed to transmit signals to the bus again.

When a signal indicating excessive temperature is received the output signal of the transceiver may be removed from the bus allowing other transceivers which are connected to the bus to communicate normally. However, when the signal indicating excessive temperature on the failed transceiver is removed by cooling, the device can be reset, generating an erroneous signal on the bus, if the failed transceiver has not cooled to a safe operating range.

SUMMARY OF THE INVENTION

According to the inventive principles, as shown in the preferred embodiment, an element such as a transmitter or a transceiver is connected to a bus. The transceiver is operated to produce pulses of current in a prearranged coded sequence indicative of operating conditions such as in an automobile for example. It is desirable to detect a failure of the transceiver, such as a short, to prevent an incorrect signal from being placed onto the bus and loading the bus. This may be by sensing the temperature of the transceiver through a temperature responsive element such as a bipolar transistor having a negative temperature coefficient. When a failure is indicated, such as by heating, the output of the transceiver may be disabled by a Control Out signal, disconnecting the transceiver from the bus and preventing a failure mode current or voltage signal from entering the bus. Where the transceiver is turned on by a Control In signal, the transceiver is prevented from producing a Control Out signal until the Control In signal has been reset and cycled through one complete cycle of operation. In the preferred embodiment, reset is off and a cycle is from off to on. This prevents the transceiver from cycling back into operation when it has cooled for example and is in its operating range but where the Control In signal had not changed from its state prior to the failure. In this way, a full initial restart is accomplished and operation of the transceiver may be prevented if its condition indicates failure.

The transceiver is prevented from being placed into operation until an indication it is within an acceptable or safe range of operation within the threshold range for failure, with a margin of safety. This insures the device will not come back on even when a Control In signal cycles to its off-on reset condition as stated above, until the failed unit is within its safe operating range below its failure threshold by that margin of safety. The two failure levels, a first for indicating failure, and a second for indicating safe operation is described as a hysteresis where the second level is different from the first.

DESCRIPTION OF PREFERRED EMBODIMENT

Figure 1:
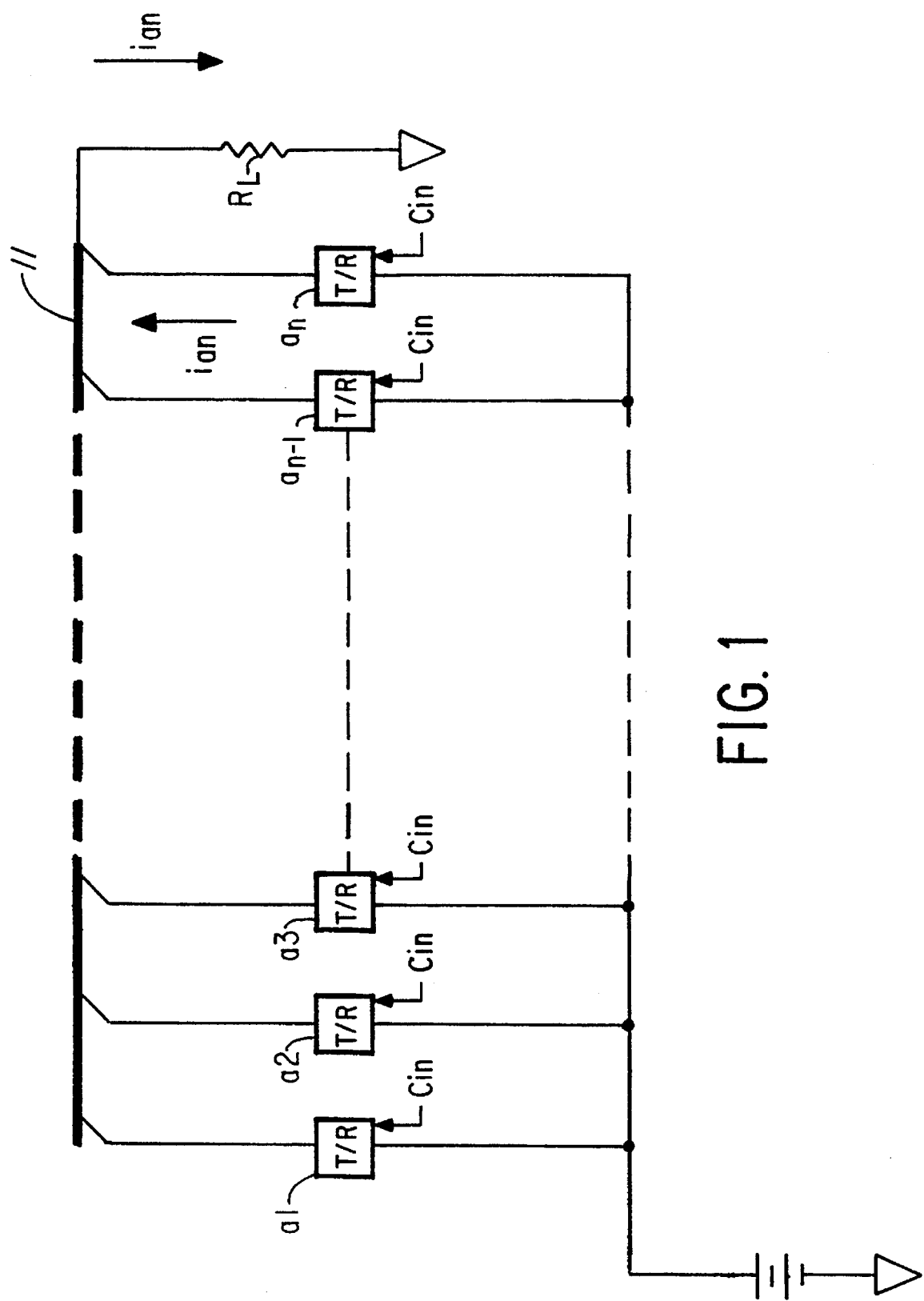
FIG. 1 is a block diagram of bus connected transmitters or transceivers.

A series of elements for example transmitters or transceivers such as a1, a2, a3 ... $a_{n-1}$, $a_n$, are connected from a voltage source such as BAT to a bus 11 as shown in FIG. 1. The output of the bus is connected through a resistor RL to ground. A symbolic current $i_{an}$ is shown from the transceivers to the bus 11 and through resistor RL to ground. In general the current $i_{an}$ is supplied by only one element at a time resulting in a voltage on the bus. All other transceivers are in the receive mode at this time. The width of pulses generated on the bus conforms to a set of codes which determine which transceiver is meant to receive the message and what the instructions are.

In the preferred embodiment, the transmitters or transceivers produce coded current pulse outputs. In the case of a transceiver failure, it is necessary to isolate that transceiver from the line and prevent that transceiver from placing a defective current or other defective signal into the bus. For example, in the case of a failure due to a short, the output current of a failed transceiver would source current onto the bus preventing communication with other transceivers and could represent a potential danger to the transceiver, by heating for example.

Each transceiver may have a separate Control In signal used to provide a reset signal to operate the transceiver after failure. According to the principles of the invention as shown in the preferred embodiment, the transceiver may not be operated after a failure has occurred until the Control In signal has been reset from on to off and then on, through one complete cycle. This assures the failed transceiver will not be placed back in its "on" condition even though its failure indicator has indicated safe operation, until the Control In signal has been reset through one cycle to off and then changed to on. In the preferred embodiment, the failure indication is a threshold signal responsive to heat. That threshold signal is one of two (2) threshold levels, as explained below. The threshold level is reduced after a failure requiring the failed unit to cool below the first failure threshold, indicative of failure, to a second separate safe threshold within a margin of safety, preventing the device from being turned back on until it is in a safe operating range separated from the first failure threshold.

Figure 2:
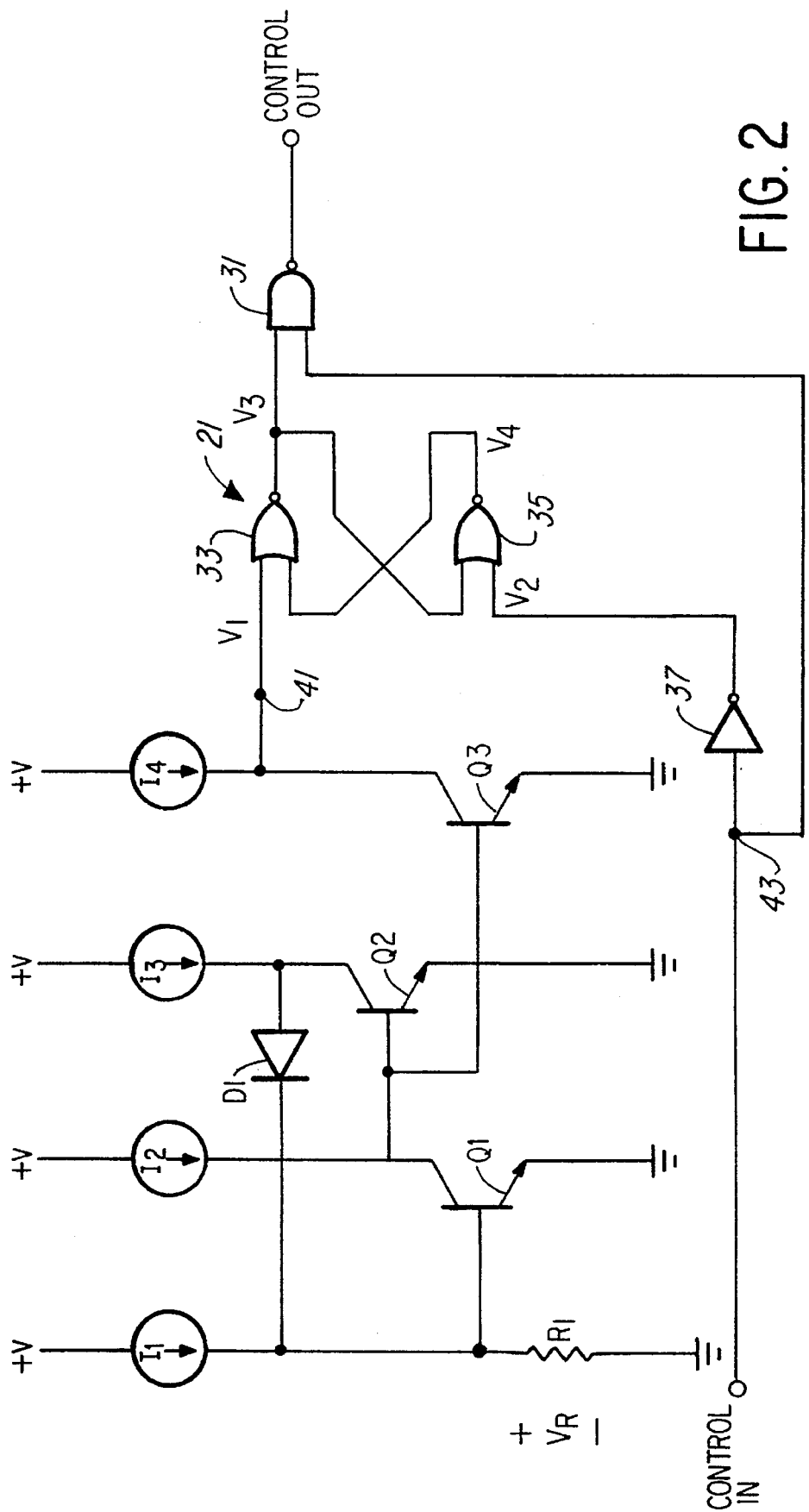
FIG. 2 is a schematic of the temperature sensitive device within a transceiver in the preferred embodiment for sensing a failure and producing a disabling signal.

The temperature sensitive device within a transceiver, as for example, for sensing a failure is shown in FIG. 2.

Figure 3:
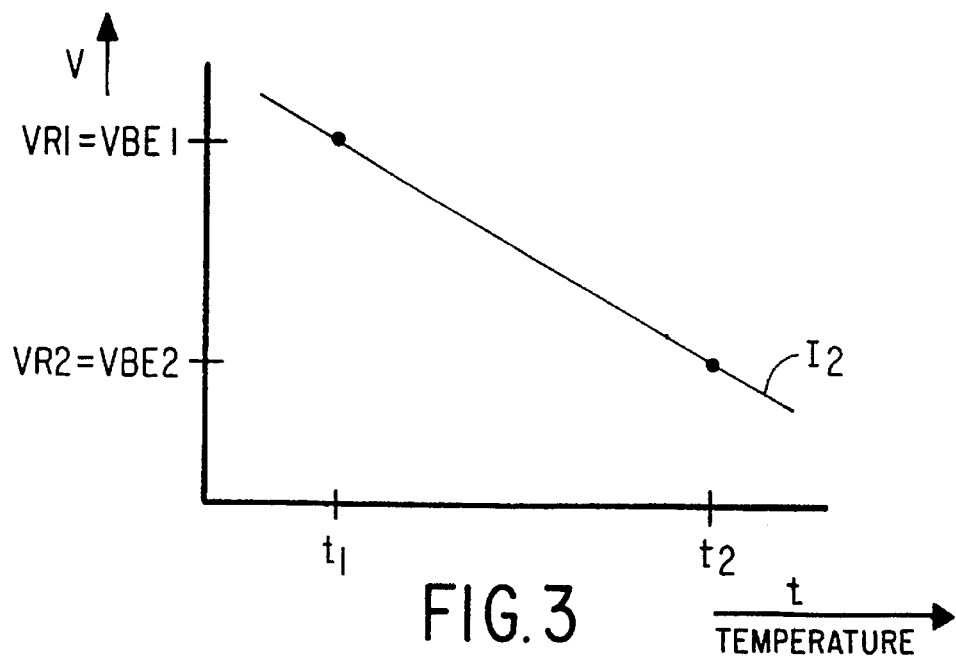
FIG. 3 shows the temperature threshold levels for the negative temperature coefficient of transistor for Q1 in FIG. 2.

As shown for the preferred embodiment, a heat sensitive transistor bi-polar transistor Q1 with a negative temperature coefficient is connected to a current source I2. Bias is supplied by a current source I1 to resistor R1 producing bias voltage VR to Q1. The base to emitter voltage ($V_{be}$) of Q1 has a negative temperature coefficient as shown in FIG. 3. As shown in FIG. 3, the base to emitter voltage (VBEQ3) necessary to sustain a current I2 at a temperature such as t2, decreases to VBE2 as the temperature increases, for example to t2.

In a bipolar transistor, collector current $I_c$ is related to the transfer characteristic of the transistor in the forward active region ($I_S$), the collector to emitter voltage $V_{CE}$, the early voltage $V_A$, the base to emitter voltage $V_{BE}$ and the thermal voltage $V_T$ given by:

$$I_C = I_S \left( 1 + \frac{V_{CE}}{V_A} \exp \frac{V_{BE}}{V_T} \right) \quad (1)$$

where $V_T = 0.026V \left[ \dfrac{T}{298° K.} \right]$ and

T = absolute temperature

For explanation purposes, the factor $1+V_{CE}/V_A$ as close to 1, has been omitted for simplification.

The relationships as described above are known to those skilled in the art and described in greater detail in Section 1.3, pages 10–19 of *Analysis of Analog Integrated Circuits* Paul R. Gray and Robert G. Meyer, John Wiley & Sons, Inc., New York, 1993.

As shown above, the current through the transistor is exponentially inversely related to its temperature T. Accordingly, as the temperature of the transistor increases, the value of base to emitter voltage VBE necessary to sustain any collector current IC will decrease. That relationship is shown in FIG. 3, and in particular how a base to emitter voltage VBE necessary to sustain a current I2 through a transistor such as Q1 as shown in FIG. 2 decreases as the temperature increases from t1 to t2. For example, a base to emitter voltage greater than the bias voltage necessary to sustain current I2 at a temperature greater than t2 would be a voltage greater than that of VBE2. Similarly, a base to emitter bias voltage necessary to sustain a current I2 at temperature, lower than t1 and lower than t2, would be a voltage greater than VBE1. At temperatures lower than t1, the current through a transistor such as Q1, would fall below I2 where base to emitter bias voltage to Q1 was below VBE1.

In operation of the preferred embodiment according to the principles of the invention, the bias level VR2 for room temperature is set at the level VBE2. Accordingly, where a temperature is less than t2 or until the temperature exceeds t2, a collector current less than I2 will flow through Q1. As a collector current less than I2 flows through Q1 until temperature t2 is reached, any remaining portion of I2 not flowing through Q1 will flow to the base of Q2 or Q3. The current to the base of Q2 and Q3 will then be:

$$\left( \frac{I2 - ICQ1}{2} = IBQ2 = IBQ3 \right) \quad (2)$$

As the temperature increases beyond t2, all of the current from I2 will flow through Q1 and no, or negligible, current will flow to the bases of Q2 and Q3. Q1 will be in saturation and Q2 and Q3 will be cut off, as shown below.

In the general use, the collector current flowing through Q2 or Q3 is:

$$ICQ2 = \beta \left( \frac{I2 - ICQ1}{2} \right), \text{ or} \quad (3)$$

$$ICQ3 = \beta \left( \frac{I2 - ICQ1}{2} \right). \quad (4)$$

where β is the current gain of Q2 and Q3. In the preferred embodiment, β of Q3 and Q4 are the same. For a temperature t2 or less, Q2 and Q3 will be in saturation.

At temperatures below t2, Q2 and Q3 will be in saturation as shown by equations 5 and 6 below:

$$\beta \left( \frac{I2 - ICQ1}{2} \right) < I3, \text{ and} \quad (5)$$

$$\beta \left( \frac{I2 - ICQ1}{2} \right) < I4. \quad (6)$$

In the preferred embodiment, transistor Q1 will not be in saturation at temperatures at t2 or less.

As the temperature of Q1 increases, above t2, Q1 will be driven into saturation, conducting all of current I2, such that, $$ICQ1 = I2 \quad (7)$$

Figure 4:
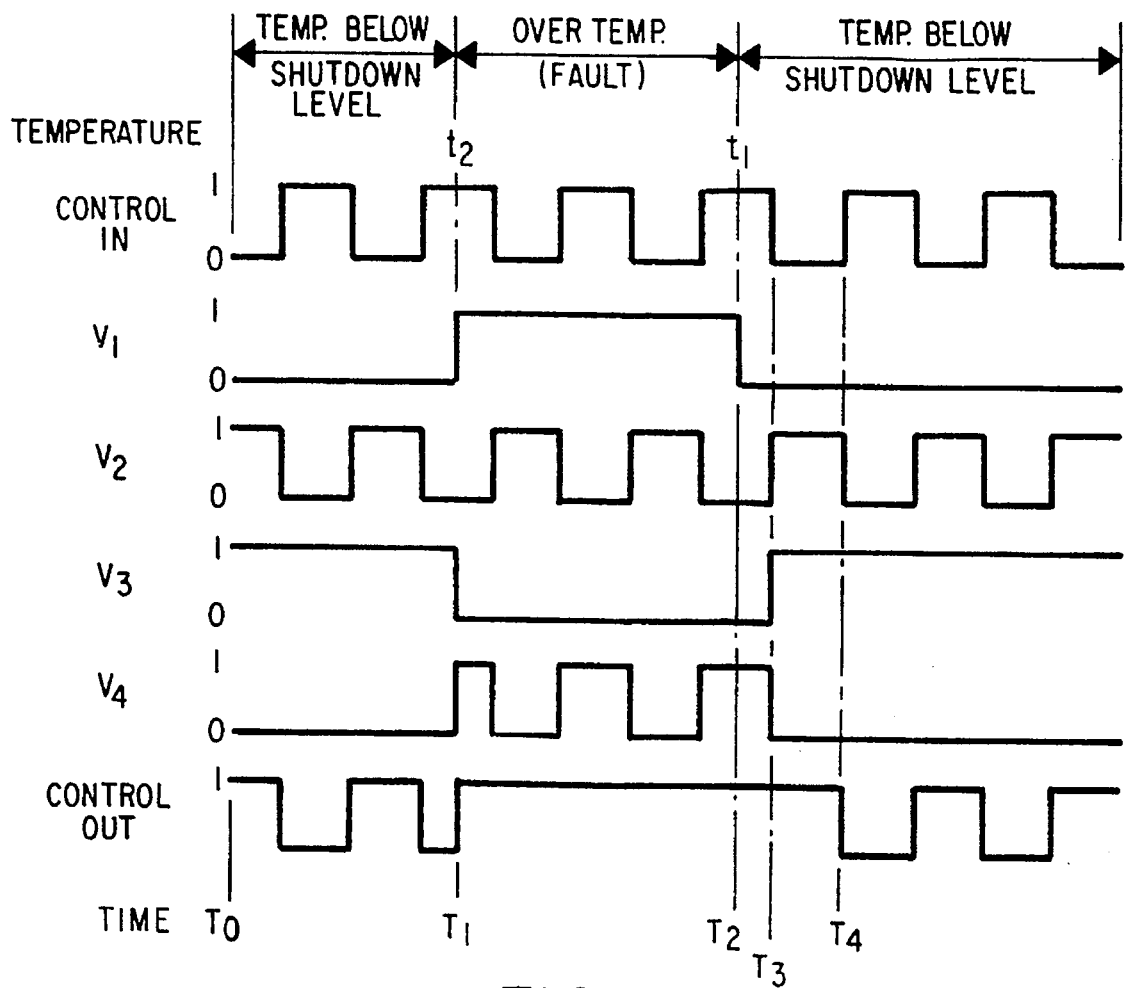
FIG. 4 is a time diagram of the operation of the preferred embodiment of FIG. 2.

At that point, no current from I2 will be available for the base of Q2 or Q3, driving Q2 and Q3 into cutoff. With Q2 in cutoff, the signal V1 output terminal t1 at the collector of Q3 increases at time $T_1$ as shown in FIG. 4. The diode D1 with Q2 cutoff is now forward biased and all of the current I3 flows into bias resistor R1 increasing its bias level VR1 to the level, $$VR1 = VBE1. \quad (8)$$

As shown in FIG. 3, a bias level above VBE1 is necessary to sustain current I2 within transistor Q1 at temperature levels below t1, As the temperature t decreases below t1, the bias voltage to the base of Q1 necessary to sustain a current I2 becomes greater than VBE1. Accordingly, as the temperature recedes to a temperature less than t1, Q1 goes from a condition of saturation to a condition of non-saturation when it cannot conduct all of the current I2 from current supply I2. Accordingly, some of the current I2 is supplied to the bases of transistors Q2, Q3 driving Q2 and Q3, into conduction, reverse biasing diode D1 and depriving resistance R1 of the current from I3. Removal of the current source I3 from resistance R1 changes the bias level VR1 at Q1 to VR2. VR2 is a level insufficient to support current I2 at temperature t1 and the current from current source I2 to the base of Q2 and Q3, is regeneratively increased driving those transistors Q2 and Q3 further into conduction and into saturation. At that point as shown at time t2, the V1 voltage signal at output terminal t1 falls indicating a non-fault condition when the temperature of the transistor Q1 is below temperature t1. If the Control In signal is then reset, as explained below, the Control Out signal will change state and follow the Control In signal 180° out of phase.

At this point, the temperature sensor, shown as transistor Q1 is at a lower separate temperature t1 than the failure temperature t2 and within a safe operating range.

As described above for the preferred embodiment, the collector of Q1 is connected to the base of Q2 and the base of Q3. A current supply, I3, supplies collector current to transistor Q2 and through diode D1, current to bias resistor R1. The collector of transistor Q3 is connected to current source 14 and produces a signal at output terminal 41 to the Set terminal of a flip-flop generally indicated by numeral 21. The output of flip-flop 21 is a Control Out signal which is then used to disable or enable a transceiver for the preferred embodiment. The Control Out signal could be used in other embodiments as would be apparent to those skilled in the art to control a voltage output into a high impedance input for example or for any other suitable control purpose. In the preferred embodiment, the Control Out signal is used to disconnect the output of a failed transceiver from the bus.

As would be apparent to one skilled in the art, any similar temperature responsive element may be substituted for the negative coefficient bi-polar transistor. In normal operation of the preferred embodiment the transceiver will produce a pulse-current coded output where the temperature of transistor Q1 is less than t2, as shown in FIG. 3. In the case of a failure, the defect causing the failure or shutdown, such as a short for example, will cause the temperature to rise. As the temperature of transistor Q1 rises and approaches temperature t2, the base to emitter voltage or base bias required to sustain current I2 will decrease reaching VBE2 at temperature t2. For temperatures above t2, current will be diverted from the base of Q2 and Q3 by transistor Q1 driving Q2, Q3 into a non-conduction state and diverting current I3 from Q2 to diode D1 biasing resistor R1. This diverted current I3 increases the bias voltage VR2 of Q1 to VR1 driving Q1 into saturation and diverting current, from current source I2, from the base of Q2, driving Q2 into cutoff. As the base of Q2 is connected to the base of Q3, Q3 is driven into cutoff raising the voltage level at the output of Q3 to V1 and producing a failure or shutdown output signal at the Control Out terminal, t1, through flip-flop 21. As would be apparent to those skilled in the art, this control out signal may then be used to isolate the failed transceiver from the bus 11, or for any other suitable purpose.

Under a failure condition, with all of current source 13 and current source I1 directed through R1, the base to emitter voltage VBE at Q1, is raised to a level VR1 above temperature t2. At temperatures below t1, only current from current source I1 will be directed to bias resistor VR reducing the bias voltage to Q1 to VR2.

According to the inventive principles and as shown in the preferred embodiment, a hysteresis effect is produced by a first failure threshold level t2 higher than the reset second or safe operation threshold level t1 where the transceiver can be placed into safe operation. The first threshold is at temperature t2 and the second threshold is at temperature t1, is shown in the preferred embodiment.

A further precaution is taken to prevent the transceiver from operating when the temperature is within the safe limit under the second threshold t1. Until the Control In signal has been reset from on to off and recycled through a complete cycle from off to on, the failed unit will not operate. As would be apparent to one skilled in the art, reset may be from off to on to off, as well.

This reset control preventing a Control Out signal from being produced until the Control In signal has recycled through a complete cycle from off to on is accomplished through the flip-flop indicated generally by numeral 21 and comprising nandgate 31, nor gates 33, 35, and inverter 37. For purposes of explanation, the terminal 41 may be thought of as the Set terminal for flip-flop 21 and terminal 43 as the Reset terminal for flip-flop 21. The operation of the preferred embodiment according to the inventive principles is best understood with reference to the timing diagram of FIG. 4.

As shown, a digital Control In signal produces a Control Out signal, in the preferred embodiment being the inverse of the Control In signal. However, as would be understood by those skilled in the art, the Control Out signal can be changed to be in phase with the Control In signal or out of phase with the Control In signal less than or more than 180°. For temperatures below the failure level or shutdown level t2 as shown in FIG. 3., the circuit as shown in FIG. 2 operates as intended with the Control Out signal for the preferred embodiment being 180° out of phase with the Control In signal. Where the temperature of transistor Q1 increases to the failure or shutdown level t2 as shown in FIG. 3 at time T1 Q1 goes into saturation forcing Q3, Q4 into cutoff and raising the collector voltage of Q4 to voltage level V1. V1 is applied at the set terminal 41 of flip-flop 21 causing V3 to go low and raising the Control Out signal to its high state through nand gate 31.

In the preferred embodiment, the output signal to the bus is removed when the Control Out signal is high. Accordingly, in the preferred embodiment, the Control Out signal is a disabling signal. However, as would be apparent to those skilled in the art, the Control Out signal could be an enabling signal and the inventive principles are not limited to the phase of the Control Out signal relative to the Control In signal or the application of the control out signal relative to its state. For example, if the control out low signal is appropriate for an application, such as removal of a bus signal, the signal to nand gate 21 from the Control In terminal 43 can be obtained from voltage level V2 shown as an input to nor gate 35.

The Control Out signal will remain high, at its disabling level for the preferred embodiment, even though the signal level V1 at the Set terminal 41 and the collector of transistor Q3 is low indicating a safe operating range below temperature t1 as shown at time T3. The V1 signal at the Set terminal 41 being a high condition as shown in the preferred embodiment, represents an over temperature fault at t2. When the temperature has cooled to temperature t1 as shown in FIG. 3., Q1 will no longer be in saturation, causing Q3 to conduct and causing the V1 signal to be low at the Set terminal 41 of flip-flop 21.

The temperature difference between t1 and t2, as shown above, represents a hysteresis. The temperature at which the system may be enabled, considering other conditions are met, is lower than the temperature at which the system is disabled. That difference between the disabling temperature t2 and the enabling temperature t1 produces the hysteresis. In this way, the system is disabled and prevented from being enabled until the temperature condition causing the fault has been reduced from the initial over temperature level t2 to a safer, cooler temperature t1 within a safe operating range, and with temperature t1 lagging temperature t2.

At temperatures below the safe operating range t1 such as after time T3, the signal V1 will be low as described above. However, a condition which must be met to enable the Control Out signal to change state is at least one off-on cycle or a reset or the Control In signal. In the preferred embodiment, the flip-flop 21 prevents a Control Out signal from changing state from high to low, representing an enabling signal in the preferred embodiment, until the reset or Control In signal has been reset from high or on to low or off and has gone through one cycle from low to high as shown at time T4 after temperature t1 has been reached. As shown at temperature t1, the signal V1 has changed state from high to low at t2. However, the Control Out signal remains high or on in the preferred embodiment from t2 to t1, representing the disabled state for the preferred embodiment. The Control Out signal cannot be made low as enabling in response to a Control In signal going high until the Control In signal first goes low and is reset and then made high as shown at time T4, The Control In signal going low and appearing at reset terminal 43, resets flip-flop 21 causing V4 to go low, making V3 high. Upon a high Control In signal at time T4, the enabling Control Out signal follows the Control In signal 180° out of a phase. For the preferred embodiment, the conventions of high for on and low for reset are used. These conventions may be changed without departing from the principles of the invention.

Accordingly, what has been shown is an apparatus and method for sensing a failure condition from one of a plurality of elements connected to a bus and transmitting signals into the bus. Responsive to this failure, the elements such as a transceiver or a transmitter as shown in the preferred embodiment may be disconnected from the bus preventing the bus from being loaded by a defective signal and allowing the bus to continue in its intended operation. According to the inventive principles, and as shown in the preferred embodiment, a hysteresis effect is produced by two threshold levels. A first failure threshold level is shown initiating a failure condition where the failed or defective unit is stopped from operating or disconnected from its system. A second safe threshold differed from the first failure threshold is established preventing the defective device from being reconnected or turned back to its on state until it has reached the second safe threshold indicative of safe operation. This second threshold as shown in the preferred embodiment may be at a temperature level below the first threshold level and indicative of safe operation. Further, according to the inventive principles as shown in the preferred embodiment safe operation is assured by preventing the defective device now in the failure mode from being turned back on or reconnected into the system when the second safe threshold has been reached and until the Control In signal, turning the device on, has cycled through at least one off, on cycle.

The principles of this invention are not restricted to the preferred embodiment but may be used to prevent the continuous operation of other components when a first failure threshold is reached and until a second safe operating threshold is reached and a Control signal turning the device has reset and cycled through one complete cycle. The method and apparatus may then produce a Control Out signal indicative of failure which then may be used to discontinue operation of the failed device such as disconnecting it from a power supply or disconnecting its output from a line or a system.

I claim:

1. A system for disabling a failed element in response to temperature, comprising:

first temperature sensitive means (Q1, Q2, Q3) for producing a temperature control signal (V3) having a first temperature control signal state (V3 low) indicative of a first temperature level (t2) and a second temperature control signal state (V3 high) indicative of a second temperature level (t1);

a Control In logic signal having an enable state (high) and a reset state (low);

a logic means (21, 37) connected to said first temperature sensitive means (Q1, Q2, Q3) and to said Control In logic signal;

said logic means (21, 37) producing a Control Out signal in a first Control Out signal state (high) for disabling said element in response to said temperature control signal in said first temperature control signal state (V3 high);

said logic means (21, 37) producing said Control Out signal in a second Control Out signal state (low) in response to said temperature control signal in said second temperature control signal state (V3 low) and said Control In logic signal changing state through a complete cycle.

2. The system of claim 1 wherein said first temperature sensitive means (Q1, Q2, Q3) includes a negative coefficient heat responsive transistor (Q1), and means for biasing (I1, R1) said negative coefficient heat responsive transistor (Q1) at a first bias level ($V_{BE2}$) indicative of said first temperature (t2); and means (I2, I3, D1, Q1, Q3) for alternating said bias to said negative coefficient heat responsive transistor (Q1) to a second bias level ($V_{BE1}$); said second bias level indicative of said second temperature (t1).

3. A temperature sensitive system for producing a output signal comprising:

a negative coefficient temperature transistor (Q1);

means for biasing said negative coefficient temperature transistor (Q1) including a resistor (R1) connected to the base of said negative coefficient temperature transistor (Q1) and a first current source (I1) connected to said resistor (R1);

a second current source (I2) connected to the collector of said negative coefficient temperature transistor (Q1);

a transistor pair (Q2, Q3);

a first transistor (Q2) of said transistor pair connected with its base connected to the collector of said negative coefficient temperature transistor (Q1) and a second transistor (Q3) of said transistor pair connected with its base to said collector of said negative coefficient temperature transistor (Q1);

a third current source (I3) connected to the collector of said first transistor (Q2), and to said means for biasing (R1) said negative coefficient transistor (Q1);

a fourth current source (I4) connected to said second transistor (Q3);

said negative coefficient temperature transistor (Q1) current increasing in response to increasing temperature;

said first and second transistor (Q2, Q3) current decreasing in response to said increasing current of said negative coefficient temperature transistor (Q1);

said current from said third current source (I3) being diverted to said resistance (R1) in response to said decreasing current in said first and second transistor (Q2, Q3);

said current through said resistance (R1) increasing in response to said diverted current from said third current source (I3) and increasing said bias to said negative coefficient temperature transistor (Q1) and increasing the current level in said negative coefficient temperature transistor (Q1);

said decreasing current in said first and second transistors (Q2, Q3) producing a set signal; and logic means (21) having an input terminal (41) connected to receive said set signal for producing a Control Out signal at an output terminal, of said logic means.

4. The system of claim 3, wherein:

said means for biasing (I1, R1) biases said negative coefficient temperature transistor (Q1) for conduction at a first bias level ($V_{BE2}$) corresponding to a first temperature (t2);

said diverted current from said third current source (I3) biases said negative coefficient temperature transistor (Q1) at a second bias level ($V_{BE1}$) corresponding to a second temperature (t1); and said first temperature (t2) is higher than said second temperature (t1).

5. A reset control system, comprising:

(a) a first transistor Q1 having a negative temperature coefficient and a first current source (I2) connected to said first transistor;

(b) a first bias means (R1, I1) connected to said first transistor for biasing said transistor;

(c) a first temperature (t2) corresponding to a first temperature threshold;

(d) a second temperature (t1) corresponding to a second temperature threshold;

(e) said first bias means (R1) for setting the bias level ($V_{BE2}$) for said first transistor (Q1) for a first current level (I2) at said first temperature (t2);

(f) a second bias means connected to said first bias means (R1);

(g) said second bias means including a second transistor (Q2) and a second current source (I3); said second current source (I3) connected to said second transistor (Q2) and to said first bias means (R1);

(h) said first current source (I2) connected to said second transistor (Q2) to provide bias current to said second transistor (Q2);

(i) said first transistor (Q1) connected to said second transistor (Q2) and arranged to divert said bias current of said second transistor (Q2) when said temperature of said first transistor (Q1) is above said first temperature threshold (t2);

(j) said second current source (I3) is arranged to supply current to said first bias means (R1) when said first transistor (Q1) diverts said bias current of said second transistor (Q2) and to set a bias level ($V_{BE1}$) for said first transistor (Q1) for a second current level (I2) at said second temperature (t1).

6. The reset control of claim 5, wherein:

(k) said first temperature (t2) is higher than said second temperature (t1).

7. The reset control of claim 6, wherein:

(l) said first means (R1), includes a bias current source (I1) connected to said bias means (R1).

8. The reset control of claim 6, wherein, (v) said second transistor (Q2) is at saturation when said first transistor (Q1) is at cut off.

9. The reset control of claim 5, including:

(aa) a diode (D1) connecting said second current source (I3) to said first bias means (R1) and wherein, (ab) said diode (D1) is arranged to be reversed biased when said first transistor (Q1) temperature is below said first temperature threshold (t2), and (ac) said diode (D2) is arranged to be forward biased when said first transistor (Q1) temperature is above said first temperature threshold t2.

10. The reset control of claim 5; including:

(m) a third transistor (Q3) connected to be supplied with bias current from said first current source (I2);

(n) a third current source (I4) connected to said third transistor (Q3);

(o) said third transistor having an output terminal (41) at the connection of said third current source I4 to said third transistor;

(p) said third transistor (Q3) is arranged to provide an output signal (V1) at a first level (high) to said output terminal (41) when said first transistor (Q1) is above first temeperature (t2);

(q) said third transistor (Q3) arranged to provide a said output signal (V1) at a second level (low) at said output terminal (41) when said first transistor (Q1) is below second temperature (t1).

11. The reset control of claim 10, including:

(w) a first logic means (21) having a set terminal connected to said output terminal (41) and having a reset terminal connected to a Control In_logic signal (V2);

(x) said first logic means (21) is arranged to provide a Control Out signal in a first state (high) in response to said output signal at said first level (high);

(y) said first logic means (21) having an input terminal (43) connected to receive a Control In signal having a first state and a second state;

(z) said first logic means (21) arranged to provide said Control Out signal at a second state (low) in response to said output signal at said second level (low) and said first Control In logic signal cycling to said second state and to said first state.

12. The reset control of claim 10, wherein:

(r) said first temperature (t2) is higher than said second temperature (t1).

13. The reset control of claim 12 and wherein, (s) said first transistor (Q1) is at saturation when above said first temperature (t2).

14. The reset control of claim 13, wherein, (t) said second transistor (Q2) and said third transistor (Q3) are at cutoff in response to first transistor (Q1) at saturation.

15. The reset control of claim 14, wherein:

(u) said first transistor (Q1) is at cutoff at said second temperature (t1).

16. A system for disabling a failed element in response to temperature, comprising:

first temperature sensitive means (Q1, Q2, Q3) for producing a temperature control signal (V3) having a first temperature control signal state (V3 low) indicative of a first temperature level (t2) and a second temperature control signal states (V3 high) indicative of a second temperature level (t1);

a Control In logic signal having an enable state (high) and a reset state (low);

a logic means (21, 37) connected to said first temperature sensitive means (Q1, Q2, Q3) and to said Control in logic signal;

said logic means (21, 37) producing a Control Out signal in a first Control Out signal state (high) for disabling said element in response to said temperature control signal in said first temperature control signal state (V3 high);

said logic means (21, 37) producing said Control Out signal in a second Control Out signal state (low) in response to said temperature control signal in said second temperature control signal state (V3 low) and said Control In logic signal changing state through a complete cycle;

said first temperature sensitive means (Q1, Q2, Q3) includes a negative coefficient heat responsive transistor (Q1), and means for biasing (I1, R1) said negative coefficient heat responsive transistor (Q1) at a first bias level ($V_{BE2}$) indicative of said first temperature (t2); and means (I2, I3, D1, Q1, Q3) for alternating said bias to said negative coefficient heat responsive transistor (Q1) to a second bias level ($V_{BE1}$); said second bias level indicative of said second temperature (t1).

* * * * *